(12) United States Patent
Chen et al.

(10) Patent No.: US 11,580,469 B2
(45) Date of Patent: Feb. 14, 2023

(54) METHODS AND SYSTEMS FOR DIRECTING COMMUNICATIONS

(71) Applicant: RingCentral, Inc., Belmont, CA (US)

(72) Inventors: JianWei Chen, Xiamen (CN); WeiMing Li, Xiamen (CN); YanRong Huang, Xiamen (CN)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/944,729

(22) Filed: Jul. 31, 2020

(65) Prior Publication Data
US 2021/0406791 A1 Dec. 30, 2021

(51) Int. Cl.
*G06Q 10/06* (2012.01)
*H04L 51/043* (2022.01)
*G06F 16/9035* (2019.01)
*H04L 67/50* (2022.01)

(52) U.S. Cl.
CPC .......... *G06Q 10/06312* (2013.01); *G06F 16/9035* (2019.01); *G06Q 10/063118* (2013.01); *H04L 51/043* (2013.01); *H04L 67/535* (2022.05)

(58) Field of Classification Search
CPC ...... G06Q 10/06312; G06Q 10/063118; G06F 16/9035; H04L 67/535; H04L 51/043
USPC ....................................................... 705/7.22
See application file for complete search history.

(56) References Cited

U.S. PATENT DOCUMENTS

| | | | |
|---|---|---|---|
| 6,816,913 B1 | 11/2004 | Liebenow | |
| 7,295,657 B1* | 11/2007 | Keohane | H04L 51/214 |
| | | | 370/352 |
| 9,313,151 B1* | 4/2016 | Wheeler | G06Q 10/107 |
| 2003/0041116 A1* | 2/2003 | Jeyachandran | G06Q 10/107 |
| | | | 709/217 |
| 2008/0109517 A1* | 5/2008 | Sarkar | G06Q 10/109 |
| | | | 709/206 |
| 2008/0120421 A1* | 5/2008 | Gupta | H04L 65/1069 |
| | | | 709/239 |
| 2010/0299615 A1* | 11/2010 | Miluzzo | H04L 67/54 |
| | | | 715/752 |
| 2011/0313803 A1* | 12/2011 | Friend | G06Q 10/103 |
| | | | 705/7.13 |
| 2015/0381532 A1* | 12/2015 | Bhatia | H04L 51/02 |
| | | | 709/206 |
| 2016/0189190 A1 | 6/2016 | Minicucci et al. | |
| 2016/0191667 A1* | 6/2016 | Desai | H04L 65/613 |
| | | | 709/217 |
| 2016/0277570 A1 | 9/2016 | Marya et al. | |

(Continued)

FOREIGN PATENT DOCUMENTS

CN 109548082 A 3/2019

OTHER PUBLICATIONS

RingCentral Introduces Glip Team Messaging and Collaboration for RingCentral Office Customers Wireless News: NA. Close-Up Media, Inc. (Nov. 5, 2015).*

(Continued)

*Primary Examiner* — Timothy Padot

(57) ABSTRACT

A method for improving communications in a digital collaboration environment by receiving a communication directed to a first user, determining that the first user is unavailable, in response to determining that the first user is unavailable, determining a second user based on an attribute, and notifying the second user about the communication directed to the first user.

19 Claims, 7 Drawing Sheets

(56) References Cited

U.S. PATENT DOCUMENTS

2018/0146343 A1\* 5/2018 Lee ...................... H04B 17/318
2018/0375945 A1\* 12/2018 Bratsman .............. G06F 16/909

OTHER PUBLICATIONS

PCT/CN2020/099214 PCT International Search Report and Written Opinion dated Mar. 5, 2021. 10 pages.

\* cited by examiner

METHODS AND SYSTEMS FOR DIRECTING COMMUNICATIONS

CROSS-REFERENCE TO RELATED APPLICATIONS

This application is a continuation of and claims the benefit of and priority to PCT International Application No. PCT/CN2020/099214 filed Jun. 30, 2020, entitled "Methods and Systems for Directing Communications," incorporated in its entirety by reference herein.

TECHNICAL FIELD

The present disclosure relates generally to the field of improving communication in a digital collaboration environment. Specifically, the present disclosure relates to systems and methods for directing communications to a replacement recipient in place of an intended recipient.

BACKGROUND

Today, communications in a digital collaboration environment allow users to interact with each other in different ways, including through voice, video, and messaging. Users have become so accustomed to contacting each other through these various means of communication that general user unavailability is often overlooked.

For example, users often go on vacation, take off several days to attend conferences, or take a business trips to areas with little to no Internet connectivity, resulting in the user's general unavailability through digital communications. While automated messages are available to notify others of the user's inaccessibility, an unavailable user often forgets to set these automated messages across one or more of their various communication platforms. Consequently, other users who try to reach the unavailable user through a chat message or email message that does not have away notifications set up can wait indefinitely for a response. Even when others are notified that the user is unavailable, the lack of response from the unavailable user creates problems when the unavailable user's input is needed to complete a project in a timely manner, make a critical decision, or otherwise provide necessary feedback. Therefore, there is a need for an improvement in directing communications within a communication environment.

SUMMARY

The present disclosure addresses improving communications in a digital collaboration environment. In some embodiments, a method for improving communications in the digital collaboration environment comprises receiving a communication directed to a first user, determining that the first user is unavailable, in response to determining that the first user is unavailable, determining a second user based on an attribute, and notifying the second user about the communication directed to the first user.

In another embodiments, a system for improving communication in the digital collaboration environment comprising a memory and at least one processor, operatively connected to the memory and configured to receive a communication directed to a first user, determine that the first user is unavailable, in response to determining that the first user is unavailable, determine a second user based on an attribute and notifying the second user about the communication directed to the first user.

DETAILED DESCRIPTION

Figure 1:
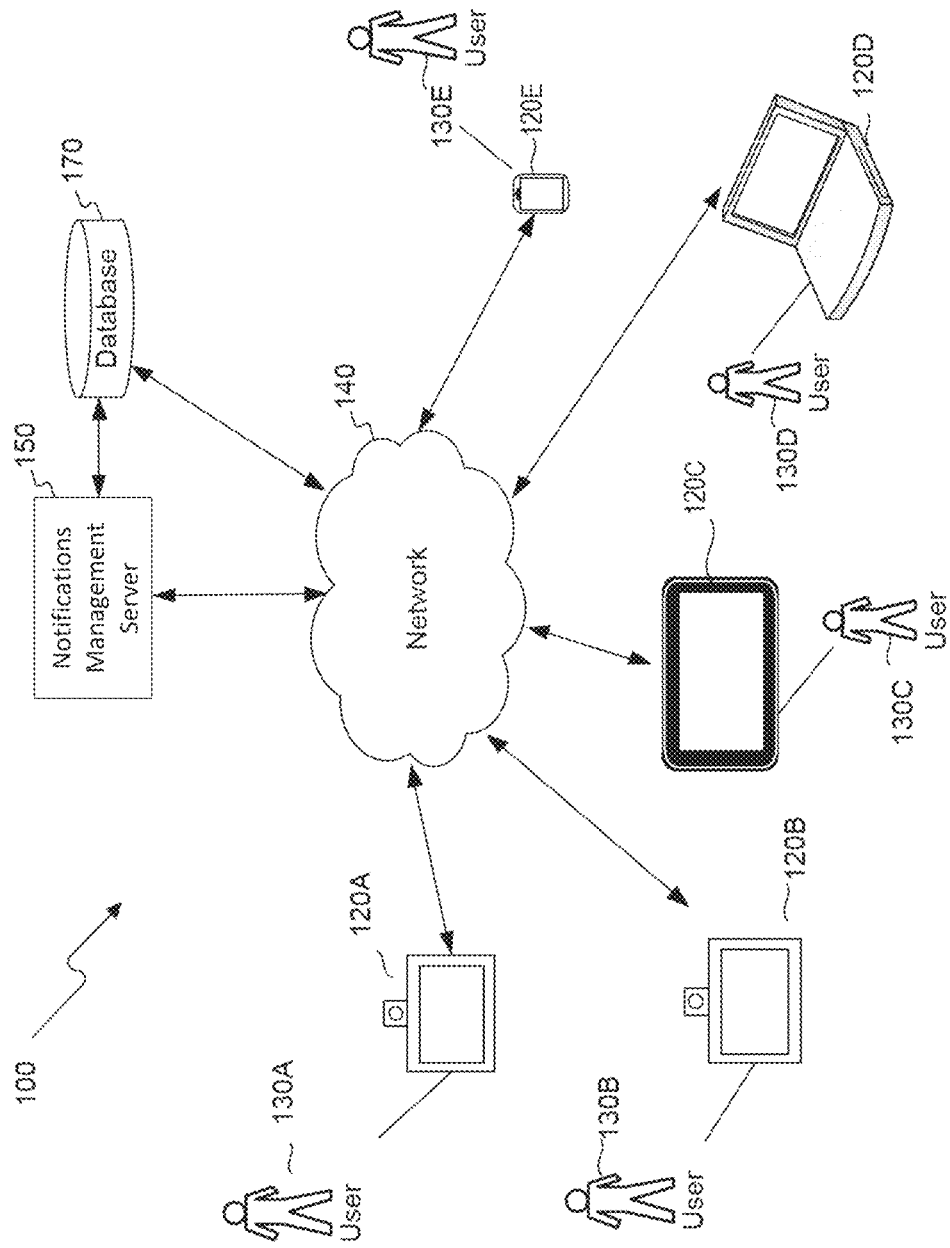
FIG. 1 depicts an example of a notifications management system.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 shows an example of a notifications management system 100 for a digital collaboration environment in which various implementations as described herein may be practiced. The notifications management system 100 for a digital collaboration environment enables a plurality of users to communicate using different types of communications, including voice, video, and messages. The notification management system 100 for the digital collaboration environment also enables a plurality of users to receive notifications regarding various communications that are directed to a user. In some examples, one or more components of the notifications management system 100 for a digital collaboration environment, such as notifications management server 150, can be used to implement computer programs, applications, methods, processes, or other software to perform the described techniques and to realize the structures described herein.

As shown in FIG. 1, the notifications management system 100 includes one or more user devices 120A-120E (collectively, referred to as user devices 120), a network 140, a notifications management server 150, and a database 170. The components and arrangements shown in FIG. 1 are not intended to limit the disclosed embodiments, as the system components used to implement the disclosed processes and features can vary.

The network 140 facilitates different types of communications including voice, video and messages between user devices 120 (some or all) and the notifications management server 150. The network 140 may be any type of network that provides communications, exchanges information, and/or facilitates the exchange of information between the notifications management server 150 and user devices 120. For example, the network 140 may be the Internet, a Local Area Network, a cellular network, a public switched telephone network ("PSTN"), or other suitable connection(s)

that enables the notifications management system 100 to send and receive information between the components of the notifications management system 100 of a digital collaboration environment. A network may support a variety of electronic messaging formats and may further support a variety of services and applications for user devices 120.

The notifications management server 150 can be a computer-based system including computer system components, desktop computers, workstations, tablets, hand-held computing devices, memory devices, and/or internal network(s) connecting the components. The notifications management server 150 may be configured to provide notifications services, such as sending notifications to users 130A-130E. The notifications management server 150 may be configured to receive information from user devices 120 over the network 140, process the information, store the information, and/or transmit notifications to the user devices 120 over the network 140. For example, the notifications management server 150 may be configured to analyze images, video signals, and audio signals, messages sent by users 130A-130E, and analyze the received content for generating a corresponding notifications to the users. The notifications management server 150 may send notifications to user devices 120A-120E, based on, for example, attributes of users 130. The notifications may include notifications sent to a user about communications that are directed to other user(s) who are unavailable at the present moment. For example, a first user is on vacation without access to a digital collaboration environment and his colleague addresses a question to him about a project that the first user is responsible for. The colleague can address the question to the first user by using mentions, such as the use of an "@" symbol before the name of the first user when sending the question within the digital collaboration environment. The notifications management server 150 can determine, that the first user is unavailable based on contextual information related to the first user and determine a second user to whom the question about the project can be redirected. Determination of the second user can be done based on attributes of the second user. The contextual information related to the first user and the attributes of the second user are described in a greater details below.

In some implementations, the functionality of the notifications management server 150 described in the present disclosure is distributed among one or more of the user devices 120A-120E. For example, one or more of the user devices 120A-120E may perform functions such as determining the contextual information related to the first user, determining the second user based on the attributes and providing this information to the notifications management server 150 or the other user devices.

The database 170 includes one or more physical or virtual storages coupled with the notifications management server 150. The database 170 is configured to store notifications received from user devices 120, profiles of the users 130 such as contact information and images of the users 130, attributes of the users 130, context of the users 130. The database 170 may further include images, audio signals, and video signals received from the user devices 120. The data stored in the database 170 may be transmitted to the notifications management server 150 for information analysis and notification generation. In some embodiments, the database 170 is stored in a cloud-based server (not shown) that is accessible by the notifications management server 150 and/or the user devices 120 through the network 140. While the database 170 is illustrated as an external device connected to the notifications management server 150, the database 170 may also reside within the notifications management server 150 as an internal component of the notifications management server 150.

As shown in FIG. 1, users 130A-130E may communicate with notifications management server 150 using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. User devices 120A-120E may also include one or more software applications that facilitate the user devices to engage in communications, such as Instant Messaging (IM), text messages, EMAIL, Voice over Internet Protocol (VoIP), video conferences, digital collaboration environment, web-based communication applications, with one another.

Figure 2:
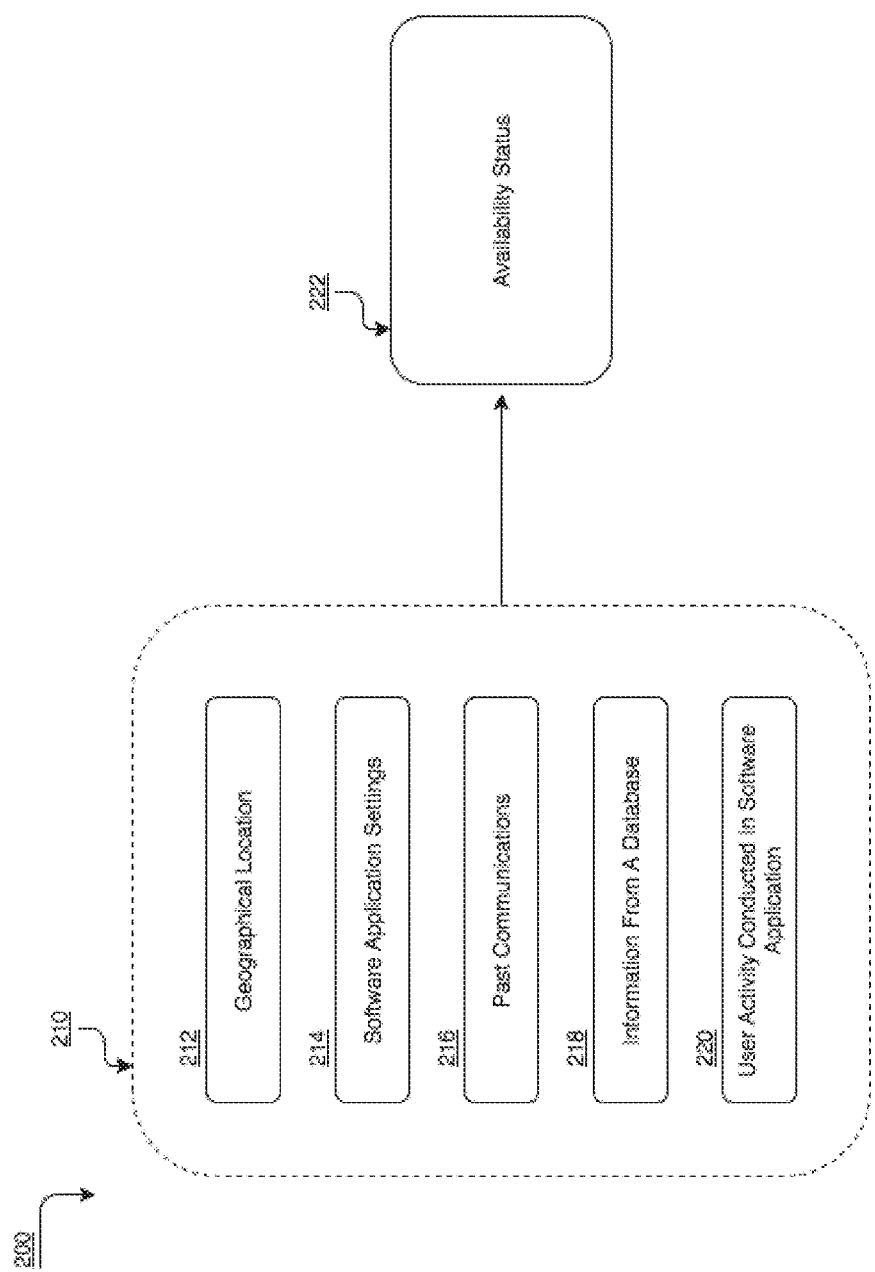
FIG. 2 depicts an example of obtaining contextual information about a first user.

In the example of FIG. 2, contextual information 210 about a first user can be obtained by a notifications management server 150. In some embodiments, the contextual information 210 can be obtained by the notifications management server 150 from a database 170 where information about the first user is stored. The contextual information 210 contains, for example, the present and/or historical geographical location 212 of the first user, software application settings 214, past communications 216 of the first user, information from a database 218, and user activities conducted in software application 220. The contextual information 210 can be saved to the database 170 by a device of the first user, such as user device 120A. The user device 120A can store geographical coordinates of its location at a point in time. Geographical coordinates can be obtained by the notifications management server 150 and the notifications management server 150 may determine whether these coordinates are frequented by the first user. If the geo-location delineated by the coordinates differ from or are outside of the first user's frequented area(s), an availability status 222 of the first user can be set to "unavailable." A threshold can be set for a distance between geographical coordinates at a present point in time and the first user's frequented area(s). For example, the availability status 222 can be set to "unavailable" if the first user is 10 miles, 50 miles or 100 miles away from his frequented areas. The frequented areas for the first user can be set as one or more areas where the first user is present 60%, 70% or 80% of a day, a week, a month, or any other measure of presence. For example, the first user has an office where he works in Redwood City, Calif. and his home in San Jose, Calif. On the weekends, the first user goes to a shopping center in San Francisco, Calif. In this case, the frequented area for the first user is the area between San Francisco and San Jose. The frequented area for the first user can be set based on a geographical border of these cities or based on edge geographical coordinates that the first user visits in the frequented area(s).

In another embodiment, the notification management server 150 can determine that the first user's availability status 222 is set to "unavailable" based on a setting that the first user can set in different applications on his device, such as user device 120A. For example, the first user can set an away message in his work email application (e.g. Microsoft Outlook) that auto-responds with a range of dates that the first user is out-of-office without access to the Internet. In another example embodiment, the first user can record a different greeting for his voicemail in a VoIP communication application stating that he will not answer calls until a certain date. In another embodiment, the first user can change his account's presence status in a digital collaboration environment (e.g. RingCentral Glip) to "out of office." Changes made by the first user in the settings of any software applications can be taken into consideration by the notifications management server 150 separately or in combination. For example, if the first user changed the settings in a single software application, the change may trigger the notifications management server 150 to change the availability status 222 of the first user to "unavailable." In another embodiment, a combination of setting changes in multiple software applications may trigger the availability status 222 change to "unavailable." It should be understood that a combination of changes in the settings of various software applications means that the first user has at least two software applications that he accesses on a daily basis. One such application can be a work-related application while another can be a personal-use application. The notifications management server 150 can assign weights to each application. Work-related applications may have more weight while personal-use applications can have less weight, for example. In other embodiments, the opposite is true and personal-use applications are weighted heavier than work-related applications. The first user can change the settings in work-related application and while leaving the settings in person-use applications unchanged. In this case, the notifications management server 150 can set the availability status 222 of the first user to "unavailable" based on changed settings in the work-related application because it was assigned more weight. In the case where the first user changed the settings in the personal-use application alone, the notifications server 150 can set the availability status 222 as "available" because the settings of the heavier weighted application were not changed by the first user. Weights can be assigned manually by the first user, assigned automatically by the notifications management server 150, or assigned automatically by a device of the first user, e.g. the user device 120A.

In other embodiments, the notifications management server 150 can determine the availability status 222 of the first user based on the past communications 216 of the first user. The notifications management server 150 can parse text, voice, and video communications (after transcribing voice data using known techniques) associated with the first user to determine if the first user mentioned any plans or activities. Upon determining that the first user will be engaged in activities during certain times that would make him otherwise unavailable, the notification management server 150 can set his availability status 222 to "unavailable." Such activities can include a vacation, a long commute or travel period, a business trip to an area with poor connection quality, etc. Parsing the first user communications can be done by the notifications management server 150 or by the user device (e.g. user device 120A). Parsing of the first user communications can be implemented using known parsing techniques for text, audio, and/or video communications. After the notifications management server 150 determines that the first user communications comprise activities that may affect the first user availability, and a time period when the first user availability will be affected, the notifications management server 150 can set the availability status 222 of the first user as "unavailable" for a determined period of time. For example, if the first user has used a digital collaboration environment to send a message notifying a colleague that he is going on a business trip to Europe and has a long flight from the United States to Europe on Friday, the notifications management server 150, based on this message, can determine that the first user will be unavailable on Friday and set the availability status 222 for the first user as "unavailable" for Friday. In some embodiments, all communications can be taken into consideration by the notifications management server 150 when the availability status 222 for the first user is determined. In another embodiment, only work-related communications are taken into consideration by the notifications management server 150. In yet another embodiment, only personal-use communications are taken into consideration by the notifications management server 150. In another embodiment, weights can be assigned to different types of communications or different areas of communications. For example, in some embodiments, text-type communications have more weight than audio-type communications, and work-related communications that have more weight that personal-use communications. In some embodiments, the opposite may be true with audio-type communications weighted more heavily than text-type communications and personal-use communications weighted more heavily than work-related communications. Any combination or variation of weights may be used. As an example, the notifications management server 150 can determine that the first user mentioned an activity in a text message to a work colleague. This activity may affect the first user availability only in the digital collaboration environment. Consequently, the notifications management server 150 can set the collaboration environment's availability status 222 for the first user to "unavailable" based on the message, taking into account that the message is a text-type communication. Furthermore, the notifications management server 150 may also take into account the work-related nature of the communication (i.e. communication between work colleagues), which has more weight than other types or areas of communications that may have been silent on the first user's activity and/or availability.

In another embodiment, the notifications management server 150 can determine the availability status 222 of the first user based on information from a database 218. Information from the database 218 can include any information from the first user, such as information that the first user posted on different social media resources, forums, internet boards, and/or any other resources that give users the ability to share information. The notifications management server 150 can track information from the database 218 that is associated with different internet resources (or databases that are each associated with a single resource) to determine if the first user shared information about an activity that can affect the first user availability status 222. For example, the first user can post a text tweet on Twitter® that he is going on vacation soon and post a photograph on Instagram® featuring the first user's boarding pass from an airport. The notifications management server 150 can obtain information from the database 218 associated with Twitter® and Instagram® that contains the associated text and photograph. After parsing the posts from social media, the notifications management server 150 can determine that the first user is engaged in activities that can affect the first user's availability status 222. Consequently, the notifications management server 150, based on obtained information from the database 218, can set the availability status 222 of the first user to "unavailable" starting from a date that is extracted from the photograph of the first user's boarding pass using known OCR techniques, for example.

In another embodiment, the notifications management server 150 can track the first user activity in one or more software applications 220 to determine the first user's availability status 222. For example, the notifications management server 150 can track the first user's activity in third party messaging applications, mobile games, navigation applications, etc. The user's historic activity may indicate a pattern of activity at certain times of the day, during certain days of the week, in association with certain devices, or any other activity patterns. If the first user is not active in third party messaging applications, online mobile games, or any other applications that the first user is usually active in, the notifications management server 150 can determine that the lack of activity is due to the first user's lack of Internet access and that the availability status 222 should be set to "unavailable." In some embodiments, the notifications management server 150 detects activity in a navigation software application. If the navigation software application indicates a destination point that is geographically distant from the first user's frequented area, then the availability status 222 for the first user should be set to "unavailable." It is understood that geographically distant may be determined based on a set distance from the frequented areas, a statistically significant distance from the frequented areas, or any other distance.

Figure 3:
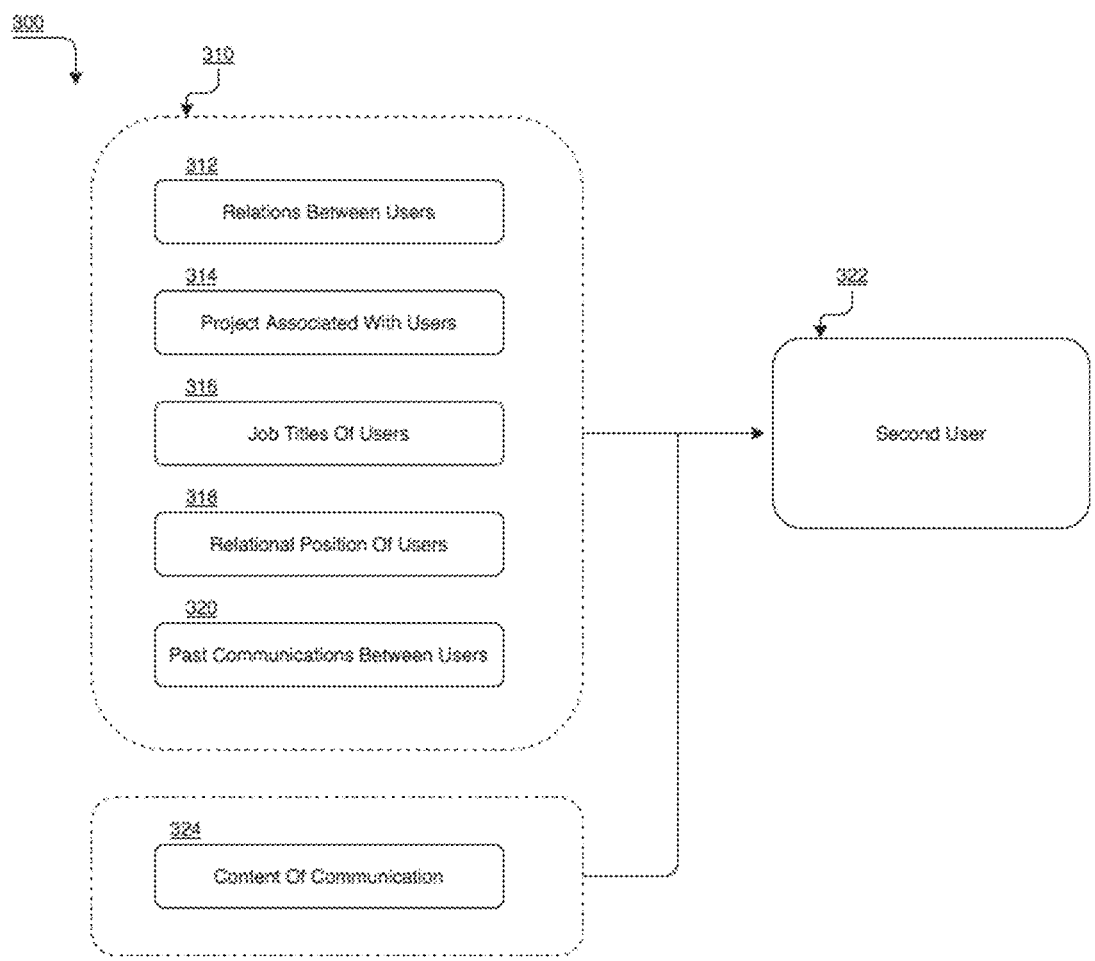
FIG. 3 depicts an example of obtaining attributes of a second user.

Once the first user's status has been set to "unavailable," the notifications management server 150 may automatically determine a second user to redirect the first user's received communications to. In the example of FIG. 3, a second user 322 can be determined based on one or more attributes 310. The notifications management server 150 determines one or more attributes 310, such as relations between users 312, projects associated with users 314, job titles of users 316, relational positions of users 318, past communications between users 320, and so forth, as further described herein. In the example of FIG. 3, it is understood that "users" refer to, for example, the first user and the second user 322.

In one embodiment, the notifications management server 150 determines a second user 322 to forward communications to based on the relations between users 312. The relations between users 312 may be determined based at least on, for example: a volume of communications between the users using a digital collaboration environment or various voice, video, and messaging applications, a connection between the users on social media like Facebook® or LinkedIn®, a vicinity of user devices (e.g. the user device 120A and the user device 120B) for a predefined time during business hours, and/or a vicinity of user devices (e.g. the user device 120A and the user device 120B) for a predefined time after business hours. The predefined time(s) for evaluating user device vicinity or proximity during business hours and/or after business hours can be set automatically by the notifications management server 150, by the first user, or by the second user 322. Any of the predefined times can be set using percentages, minutes, hours, or any other increment. For example, the predefined time for evaluating proximity or vicinity during business hours can be set as 30% of daily business hours while the predefined time for non-business hours can be set to one hour. A proximity or vicinity of user devices can be determined based on GPS coordinates obtained by the notifications management server 150, Bluetooth connections established between user devices, or the presence of each user device in a list of Bluetooth devices that are available for connection without an established connection. Additionally, vicinity can be based on NFC technique if such feature is present on user devices. The user devices can be deemed in vicinity by the notifications management server 150 if they are not further than 3 meters or any other distance that can be set automatically be the notifications management server 150 or by the first user.

The notifications management server 150 can also determine connections between the users on social media and store the results in the database 170. For example, the notifications management server 150 can determine that the first user and the second user 322 are marked as "friends" on Facebook® and connected as first level peers on LinkedIn®. In this case, the notifications management server 150 can mark the relation between the first user and the second user 322 as a "close relation."

As another example, the notifications management server 150 can track the volume of communications between the users using a digital collaboration environment or various voice, video, and/or messaging applications. A threshold for the volume of communications between the users through the digital collaboration environment or various voice, video, and/or messaging applications can be set automatically by the notifications management server 150, by the user device 120A, or manually by the user 130A. For example, the notifications management server 150 can determine that the relation between users 312 can be marked as "close relation" if the threshold for the volume of communications between the users using the digital collaboration environment or various voice, video, and/or messaging applications exceeds 1,000 words per day for all possible types of communications. The threshold can be set for each type of communication separately. For example a threshold for the communication using the digital collaboration environment can be set to 500 words per day, a threshold for voice communications can be set to fifteen minutes per day, a threshold for video communications can be set to one hour over a course of three days, and a threshold for a communication using a messaging application can be set to twenty words over the course of two hours. The thresholds mentioned above can be set automatically by the notifications management server 150 or manually by the first user or second user 322. The relation between users 312 attribute 310 can be set to "close relations" when the threshold is reached for a single type of communication, some types of communications, a majority of the types of communications, or all types of communications. As an example, the notifications management server 150 can set the relation between users 312 attribute 310 to "close relations" if: the user devices are within the same vicinity for more than the predefined time, the users are connected through social media resources, and the volume of communications have reached at least one threshold.

Other rankings or options can be used to specify relation between users 312. For example, a scale from one to five can be used to describe the relation between users 312 attribute 310 where "one" is no relation and "five" is a close relation. In another example, several descriptive options can be used, such as a "no relation" option, a "co-workers" option, and a "friends" option. Different time periods for determining the vicinity of user devices can be used to assigned different levels of relation between users 312. Moreover, different degrees or the number of social media connections can be used to assigned different levels of relation between users 312. The database 170 can store all the information mentioned above. The database 170 may also link the first user and/or the second user 322 with any of the values determined above, such as the values for the predefined times for the vicinity of user devices, the connections via social media resources, the volume of communications between users over a collaboration, voice, video, and/or messaging application, as well as any other values.

In other embodiments, the notifications management server 150 determines the second user 322 based on projects associated with users 314. For example, if the first user works on a project named "Release 10.1," the notifications management server 150 can determine that the second user 322 is associated with the same project based on a records in internal Customer Relationship Management (CRM) system of a company, task management system of the company, or communications featuring "Release 10.1" in the digital collaboration environment, email applications where the user second user 322 is mentioned as a recipient, or any other form of communication.

The notifications management server 150 can also determine the second user 322 to forward communications to based on the job title of users 316. For example, after the notifications management server 150 determines that the first user has an availability status 222 set to "unavailable," the notifications management server may request, from the database 170, a job title of the first user. Once it obtains the job title of the first user, the notifications management server 150 searches the database 170 for a user with the same title to serve as the second user 322. For example, if the User 130A has title of "engineering manager," another user with the same title should have same-level access to information so he can provide answer on a communication directed to the first user (e.g. the User 130A).

In another embodiment, the second user 322 can be determined by the notifications management server 150 based on relational positions of users 318. For example, the second user 322 can be a direct subordinate, a direct manager, or a teammate of the first user. In this example, due to these close relational positions inside the organization, it makes logical sense to make the second user aware of the first user's availability and of any communications to the first user such that the second user 322 can answer any communications that are directed to the first user.

In another embodiment, the notifications management server 150 can determine the second user 322 based on past communications between the users when the past communications 320 relate to a current content of communications 324. The notifications management server 150 can request communication information related to the first user from the database 170. The server 150 may then parse, using known parsing techniques, the communication information to determine a colleague with whom the first user had the most past communications related to the current content of communications 324. In an embodiment, the notifications management server 150 can determine the second user 322 based on the past communications 320 using known search algorithms that are used in search engines such as Google® and determine a first ranked search result based on word matches to the second user 322. For example, if the first user received the communication 324 about "Release 10.1," the notifications management server 150 parses past communications 320 between users to determine that a particular individual, who had the most communications with the first user about the "Release 10.1" topic, should be designated the second user 322. The determination is made based on first ranked result of known search algorithms that match the current content of communication 324.

In some embodiments, the notifications management server 150 determines the second user 322 to redirect communications to based on the attributes 310 and the current content of communications 324. The second user 322 can differ based on the current content of communications 324. For example, the notifications management server 150 can determine that User 130E should be designated as the second user 322 for the communication content 324 related to the topic "Release 10.1," but determine that User 130D should be designated as the second user 322 for the content of communication related to the "Release 10.2" topic.

In another embodiment, the notifications management server 150 can determine the second user 322 based on all the attributes 310 or some of the attributes 310. For example, the notifications management server 150 can take into consideration only the past communications between users 320 and the projects associated with users 314 while ignoring all other attributes. In another example, the notifications management server 150 can assign weights to each of the attributes 310 and determine which user should be the second user 322 based on the attributes 310 with a certain weight. The weights may serve as numerical classifiers for assigning various second users, in some embodiments. For example, if the notifications management server 150 uses a scale from one to five to assign weights, where one is the lightest weight and five is the heaviest weight, the notifications management server 150 may assign a "two" to each of: the relations between users 312, the title of users 316, and the positions of users 318. The notifications management server 150 may also assign a "five" to each of: the project associated with users 314 and the past communications between users 320. In this case, any attributes 310 with an assigned weight of "two" will result in the notifications management server 150 redirecting communications intended for the first user to the User 130B because he has close relations with the first user, a title similar to the first user, and a linked relational position to the first user. Meanwhile, the attributes 310 with an assigned weight of "five" will result in the notifications management server 150 redirecting communications to the User 130E based on the "Release 10.1" project shared between the first user and User 130E and past communications between the first user and the User 130E that includes numerous uses of the keyword "Release 10.1." In some embodiments, the "Release 10.1" keyword may be ranked as a first match based on known search algorithm applied to the past communications between users 320.

Figure 4:
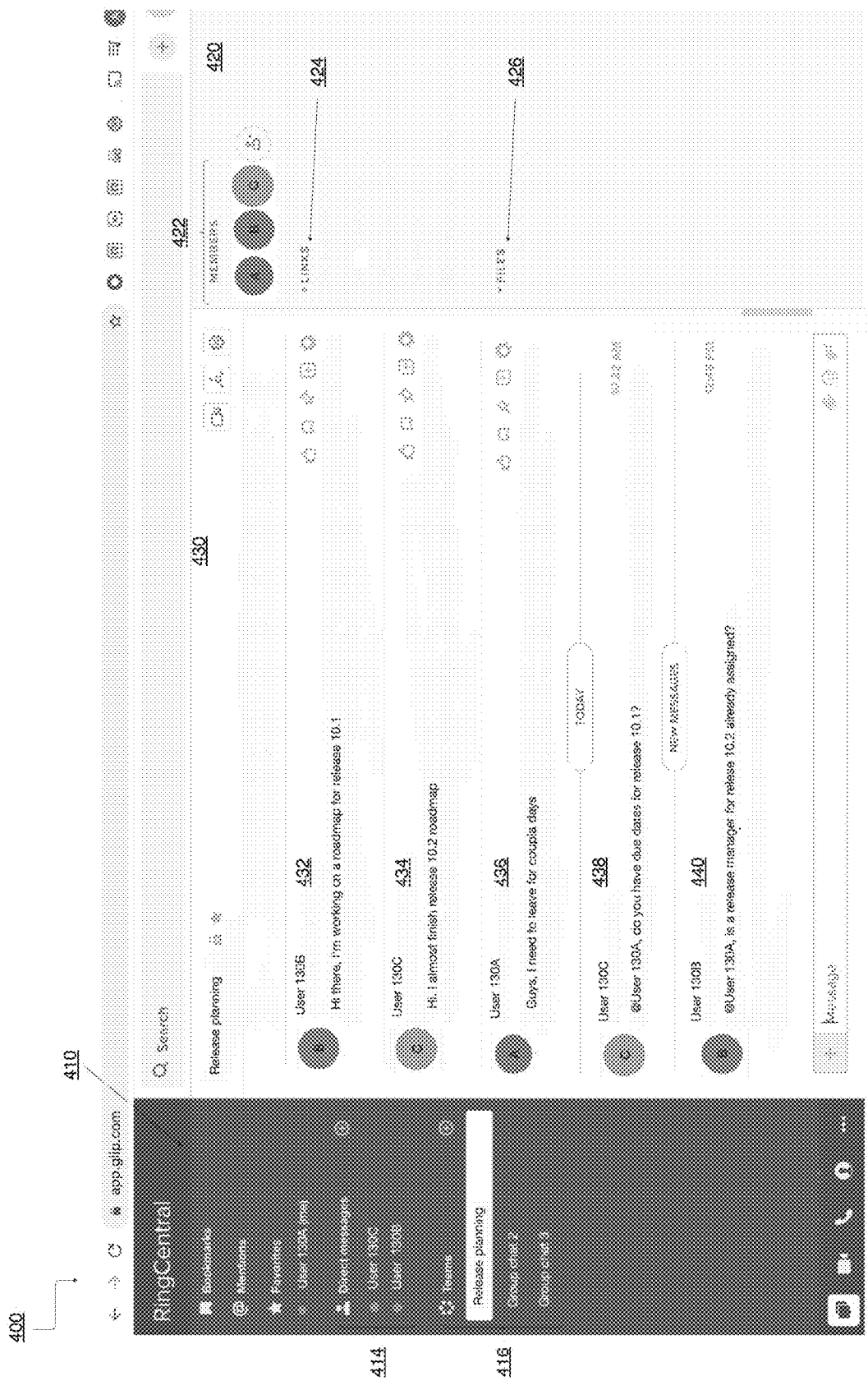
FIG. 4 depicts an example of a User Interface (UI) of a digital collaboration environment.

FIG. 4 depicts an example of a user interface (UI) 400 for a web-based digital collaboration environment where the users 130A-130E can communicate using different types of communication including voice, video, and messages. The UI 400 can be displayed on a user device 120A and associated with User 130A. The UI 400 can include a left side panel 410 that displays different view options, such as view option @Mentions 412 where only communications directed to User 130A can be shown, for example communications directed to User 130A using an "@" mention symbol or any other communications that were initially directed to the first user but for which User 130A was determined as the second user 322. A list of a direct communications 414 can be displayed in the left side panel 410 where a list of users with whom the User 130A had exchanged direct messages are shown. A list of group message communications 416 can be displayed on the left side panel 410 where group messaging chats are listed. Members 422 of a group chat may be displayed on a right side panel 420, along with other information related to a group messaging chat, such as web links 424 and/or files 426 that were shared during group chat messaging communication between Users 130A-C. A history of communications in the web-based digital collaboration environment can be shown in a center panel 430. The central panel 430 may include a control function "start video call" 442 which allows any participant to start video calls between all group messaging chat members 422, as well as a control function "start voice call" 444, which allows any participant to start voice call between all group messaging chat members 422.

In the example embodiment, the center panel 430 shows the history of communications in a "Release planning" group messaging chat between members 422. The members 422 include User 130A, User 130B, and User 130C. Any number of users can participate in the group chat messaging communications. In the example of UI 400, the history of communications in the "Release planning" group messaging chat contains a message 432 from User 130B where User 130B provides an update on a status of User 130B's task, which relates to a "Release 10.1" project. The "Release planning" group also contains a message 434 from User 130C where User 130C provides an update on a status of User 130C's other task, which relates to a "Release 10.2" project. The "Release planning" group also contains a message 436 from User 130A where User 130A provides an update on User 130A's immediate future plans. The next day, User 130C sends a communication 438 directed to User 130A using the "@" mention symbol asking about due dates for "Release 10.2." Some time after that, the User 130B sends a communication 440 directed to the User 130A using the "@" mention symbol asking if a release manager for release 10.1 is already assigned. The notifications management server 150 determines, based at least on the past communications 216 (i.e. the message 436) of the first user (i.e. User 130A), that the availability status 222 for User 130A should be set to "unavailable." After determining User 130A's availability status 222 is set to "unavailable," the notifications management server 150 determines the second user 322, as described in FIG. 3. Each message shown in the central pane 430 may comprise control functions 446 that allows any participant of the group messaging chat members 422 to express approval of a message by selecting a "like" control function, pin the message by selecting a "pin" control function, or bookmark the message by selecting a "bookmark" control function.

Figure 5:
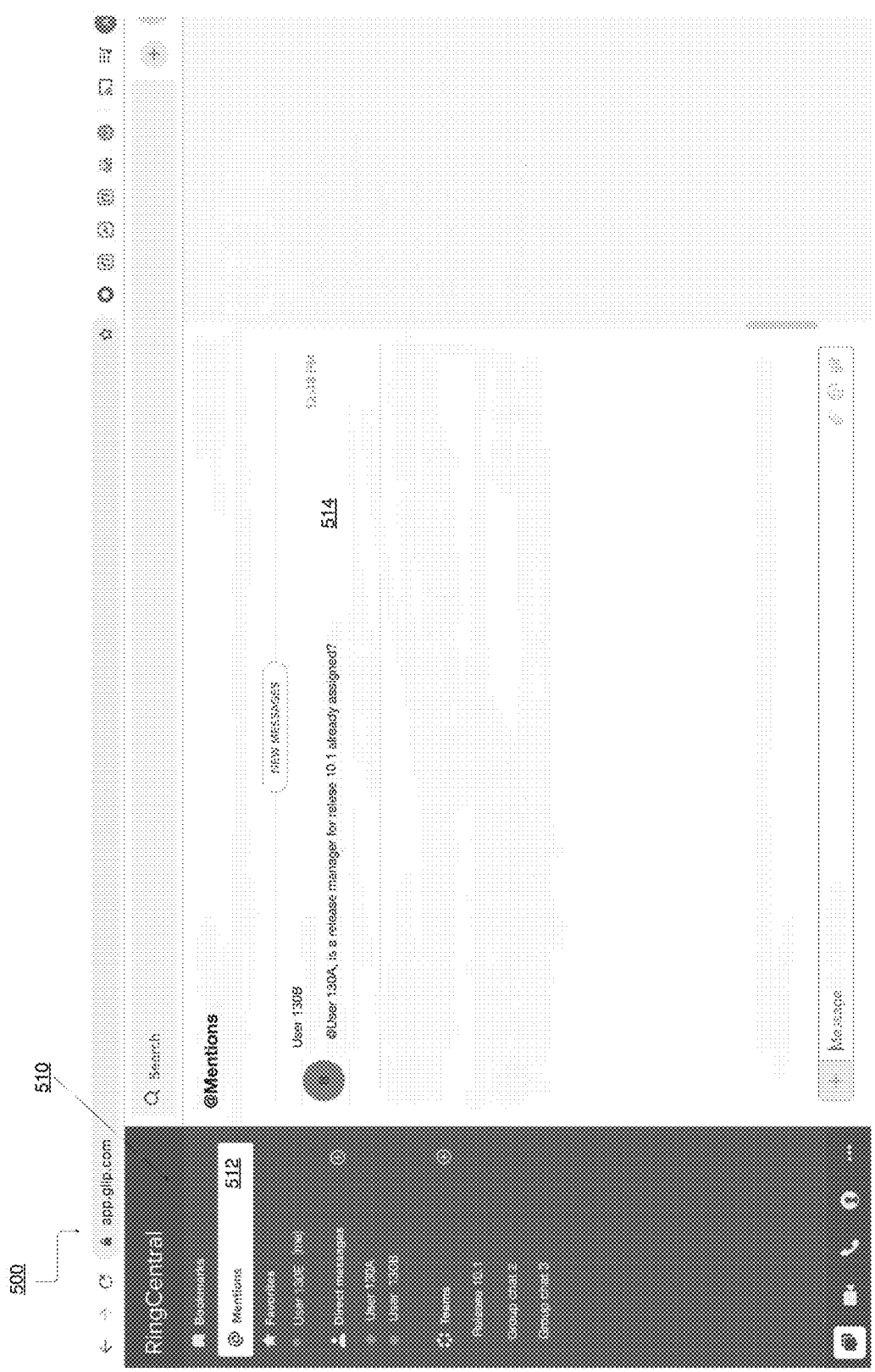
FIG. 5 depicts an example of a UI of a digital collaboration environment of a user.

FIG. 5 depicts an example of a user interface (UI) 500 for a web-based digital collaboration environment where the users 130A-130E can communicate using different types of communication including voice, video, and messages. The UI 500 can be displayed on a user device 120E and associated with User 130E. The UI 500 comprises a left side panel 510 where different view options can be displayed. For example, the view option @Mentions 512 can be displayed where a communications directed to User 130E are shown. In the embodiment of FIG. 5, a notification 514 for a communication that was originally directed to the first user (e.g. the User 130A) is also displayed once the notifications management server 150 determines that the second user 322 is User 130E for the message 440. User 130E can subsequently reply to the notification 514 on behalf of User 130A because User 130E has received the notification 514 in the digital collaboration environment and is aware of the content of the communication 324 (i.e. the message 440).

Figure 6:
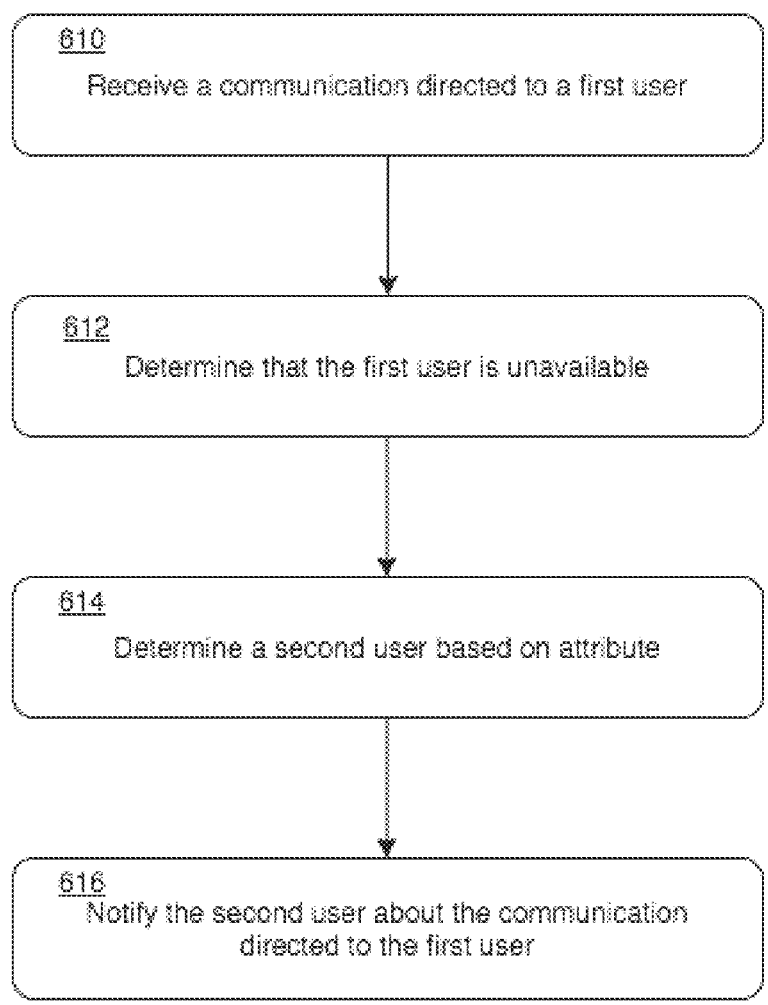
FIG. 6 depicts an example of a flowchart for sending notifications.

FIG. 6 depicts an example of a flow chart 600 for sending notifications to a second user. Notifications can be sent by the notifications management server 150. At step 610, the conference management server 150 can determine that a communication directed to a first user is received in a digital collaboration environment, such as in the digital collaboration environment shown in FIG. 4. The notifications management server 150 can determine that the communication is directed to the first user based on a mention symbol that was used in the communication. For example, User 130B sends a message with a text "@User 130A is a release manager for release 10.1 already assigned?" The notifications management server 150 determines that the message is directed to User 130A based on @ mention symbol used in the message. While the example of FIG. 4 uses the "@" symbol as a mention symbol, any method of mentioning specific users may be used. The notification management server 150 can determine that the communication is directed to the first user based on a person's name mentioned in the communication, a user's username or handle, an email address, a phone number, or any other information that allows the notifications management server 150 to determine the first user. One or more different types of communications may be used, such as text messages, audio, or video.

At step 612, the notifications management server 150 determines that the first user is unavailable. In one example embodiment, the notifications management server 150 can determine the unavailability based on contextual information 210 related to the first user. In the example embodiment of FIG. 4, the past communications 216 were taken into consideration by the notifications server 150. The message 436 from User 130A specifying that User 130A needs to leave for couple days is parsed by the notifications management server 150 using known parsing techniques and the availability status 222 is set to "unavailable." This availability status 222 can be stored in the database 170. Other contextual information can be used to determine the availability status 222 of User 130A. For example, the geographical location of User device 120A can be used. If User device 120A is located outside a frequented area, then the notifications management server can set the availability status 222 of User 130A to "unavailable." In another example embodiment, if the User 130A changes settings in a software applications, such as when User 130A sets an autoreply in Microsoft Outlook for a designated period of time, the notifications management server 150 can set the availability status 222 of User 130A as "unavailable" for that period of time. In another example embodiment, the information from a database 218 can be taken in consideration by the notifications management server 150. For example, if User 130A posts a tweet that he is leaving for couple days, the notifications management server 150 can utilize the Twitter® database to obtain the post and set the availability status of User 130A to "unavailable." In another embodiment, the notifications management server 150 can track the activity in software applications 220 to determine if the availability status 222 of User 130A should be set to "unavailable." If User 130A stops using his regular applications like messenger, an email application, and so forth, but starts using navigation applications, this pattern of usage can trigger the notifications management server 150 to set the availability status 222 of User 130A to "unavailable."

At step 614, the notifications management server 150 determines the second user based on one or more attributes. In the example embodiment, User 130E was chosen by the notifications management server 150 based on projects associated with users 314 and past communications between users 320. Both User 130A and User 130E are associated with a project "Release 10.1" and exchanged numerous communications related to this "Release 10.1" project. In this example embodiment, the notifications management server 150 determined the second user based on top-rated search results generated using known search algorithms. In another example embodiment, the notifications management server 150 can determine the second user 322 based on: the relations between users 312 (e.g. if they are close friends), the job title of users 316 (e.g. if they have the same titles and have same level of access to information), the positions of users 318 (e.g. if the second user 322 is a direct subordinate or direct manager of the first user and should know an answer to the message 440). In other embodiments, the notifications management server 150 determines the second user 322 based on the content of communication 324. For example, if the message 440 relates to the project "Release 10.1," then the notifications management server 150 determines that User 130E, who is involved in "Release 10.1," should be the second user 322 who can help answer the question in message 440. In some embodiments, the notifications management server 150 determines User 130D to be the second user 322 for the message 438 based on the content of communications 324 associated with the message 438, the relations between users 312, and the relational positions between users 318. The notifications management server 150 may also determine that User 130D is a close friend of User 130A and set the relations between users 312 as "close." The notifications management server 150 may also determine that User 130D is a direct subordinate of User 130A and that User 130A and User 130D are assigned to the project "Release 10.2." Based on the attributes 310 mentioned above, the notifications management server 150 determines that User 130D should be assigned as the second user 322 for the message 438.

At step 616, the notifications management server 150 sends a notification to the second user 322 that was determined in step 614. For example, the notifications management server 150 shows the notification 514 in UI 500 associated with User 130E to notify User 130E about the message 440 that was originally directed to User 130A. The notification 514 can be shown as a message in the digital collaboration environment in the @Mentions 512 type of view in the left side panel 510. Other types of notifications can be shown to the second user 322. For example, a pop-up window can be shown to the second user or an alarm can be produced. In another embodiment, the notifications at step 616 can be the same type of communication that is directed to the first user. For example, if the first user receives a voicemail message with a question, the notifications management server 150 can determine the availability status of the first user as "unavailable," determine the content of communications 324 by transcribing voicemail message to a text using known speech-to-text techniques, parsing the text using known parsing techniques, and determining the second user 322 based on the content of communications 324 and the attributes 310.

Figure 7:
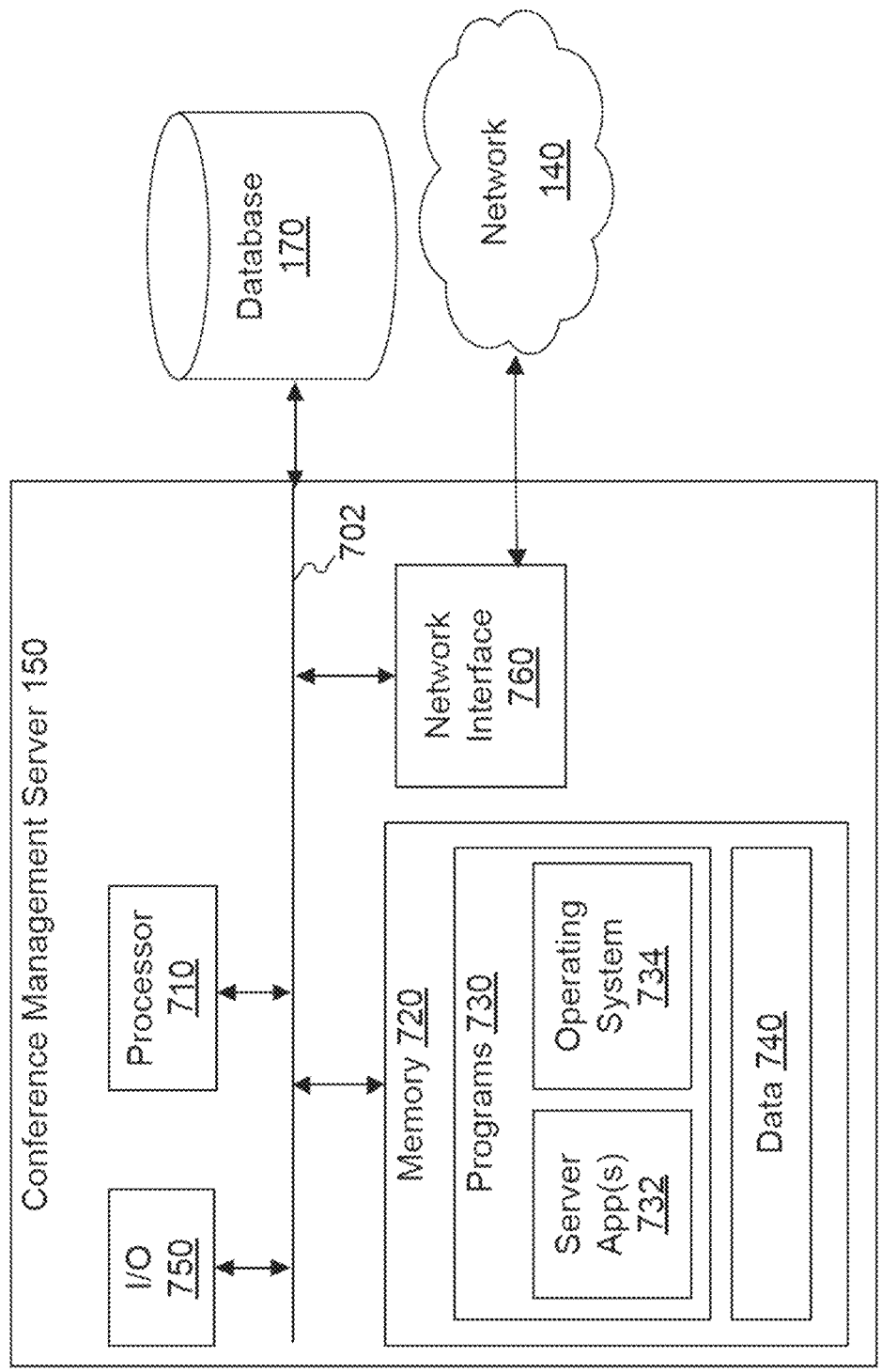
FIG. 7 depicts an example of a notifications management server.

FIG. 7 shows a diagram of an example notifications management server 150, consistent with the disclosed embodiments. The notifications management server 150 includes a bus 702 (or other communication mechanism) which interconnects subsystems and components for transferring information within the notifications management server 150. As shown, the notifications management server 150 may include one or more processors 710, input/output ("I/O") devices 750, network interface 760 (e.g., a modem, Ethernet card, or any other interface configured to exchange data with a network), and one or more memories 720 storing programs 730 including, for example, server app(s) 732, operating system 734, and data 740, and can communicate with an external database 170 (which, for some embodiments, may be included within the notifications management server 150). The notifications management server 150 may be a single server or may be configured as a distributed computer system including multiple servers, server farms, clouds, or computers that interoperate to perform one or more of the processes and functionalities associated with the disclosed embodiments.

The processor 710 may be one or more processing devices configured to perform functions of the disclosed methods, such as a microprocessor manufactured by Intel™ or manufactured by AMD™. The processor 710 may comprise a single core or multiple core processors executing parallel processes simultaneously. For example, the processor 710 may be a single core processor configured with virtual processing technologies. In certain embodiments, the processor 710 may use logical processors to simultaneously execute and control multiple processes. The processor 710 may implement virtual machine technologies, or other technologies to provide the ability to execute, control, run, manipulate, store, etc. multiple software processes, applications, programs, etc. In some embodiments, the processor 710 may include a multiple-core processor arrangement (e.g., dual, quad core, etc.) configured to provide parallel processing functionalities to allow the notifications management server 150 to execute multiple processes simultaneously. It is appreciated that other types of processor arrangements could be implemented that provide for the capabilities disclosed herein.

The memory 720 may be a volatile or non-volatile, magnetic, semiconductor, tape, optical, removable, non-removable, or other type of storage device or tangible or non-transitory computer-readable medium that stores one or more program(s) 730 such as server apps 732 and operating system 734, and data 740. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The notifications management server 150 may include one or more storage devices configured to store information used by processor 710 (or other components) to perform certain functions related to the disclosed embodiments. For example, the notifications management server 150 includes memory 720 that includes instructions to enable the processor 710 to execute one or more applications, such as server apps 732, operating system 734, and any other type of application or software known to be available on computer systems. Alternatively or additionally, the instructions, application programs, etc. are stored in an external database 170 (which can also be internal to the notifications management server 150) or external storage communicatively coupled with the notifications management server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 720 and database 170 may include one or more memory devices that store data and instructions used to perform one or more features of the disclosed embodiments. The memory 720 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the notifications management server 150 may be communicatively connected to one or more remote memory devices (e.g., remote databases (not shown)) through network 140 or a different network. The remote memory devices can be configured to store information that the notifications management server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 730 include one or more software modules causing processor 710 to perform one or more functions of the disclosed embodiments. Moreover, the processor 710 may execute one or more programs located remotely from one or more components of the communications system 100. For example, the notifications management server 150 may access one or more remote programs that, when executed, perform functions related to disclosed embodiments.

In the presently described embodiment, server app(s) 732 causes the processor 710 to perform one or more functions of the disclosed methods. For example, the server app(s) 732 may cause the processor 710 to analyze different types of communications to determine communications directed to a user, determine context of a first user and attributes of a second user to send notifications about communications directed to the first user to appropriate second user. In some embodiments, other components of the communications system 100 may be configured to perform one or more functions of the disclosed methods. For example, user devices 120A-120E may be configured to analyze different types of communications to determine communications directed to a user, determine context of a first user and attributes of a second user to send notifications about communications directed to the first user to appropriate second user.

In some embodiments, the program(s) 730 may include the operating system 734 performing operating system functions when executed by one or more processors such as the processor 710. By way of example, the operating system 734 may include Microsoft Windows™ Unix™, Linux™, Apple™ operating systems, Personal Digital Assistant (PDA) type operating systems, such as Apple iOS, Google Android, Blackberry OS, Microsoft CE™, or other types of operating systems. Accordingly, disclosed embodiments may operate and function with computer systems running any type of operating system 734. The notifications management server 150 may also include software that, when executed by a processor, provides communications with network 140 through the network interface 760 and/or a direct connection to one or more user devices 120A-120E.

In some embodiments, the data 740 includes, for example, a data associated with a context of a first participant or a data associated with an attributes of a second participant.

The notifications management server 150 may also include one or more I/O devices 750 having one or more interfaces for receiving signals or input from devices and providing signals or output to one or more devices that allow data to be received and/or transmitted by the notifications management server 150. For example, the notifications management server 150 may include interface components for interfacing with one or more input devices, such as one or more keyboards, mouse devices, and the like, that enable the notifications management server 150 to receive input from an operator or administrator (not shown).

What is claimed is:

1. A computer implemented method for improving communication in a digital collaboration environment the method comprising:

receiving a digital communication from a source device in the digital collaboration environment, wherein the digital communication is directed to a device associated with a first user, wherein the digital collaboration environment includes one or more of a voice communication, video communication, or a text messaging communication;

causing to determine, using the device associated with the first user, geographical locations associated with the first user over a period of time;

receiving the geographical locations associated with the first user over the period of time, from the device associated with the first user to form historical geographical locations associated with the first user;

causing to determine, using the device associated with the first user, a current geographical location associated with the first user;

determining that the first user is unavailable in the digital collaboration environment based on a setting in a software application that is different from the digital collaboration environment and further based on delineation of the current geographical location from the historical geographical locations;

in response to determining that the first user is unavailable, determining a second user based on an attribute; and transmitting a notification signal to a device associated with the second user about the communication directed to the device associated with the first user.

2. The method of claim 1, wherein determining the second user is additionally based on a content of the communication directed to the device associated with first user.

3. The method of claim 1, wherein the communication directed to the device associated with first user comprises a text message in the digital collaboration environment.

4. The method of claim 1, wherein the communication is directed to the device associated with first user using a mention symbol.

5. The method of claim 1, wherein determining that the first user is unavailable is further based on at least one of: lack of electronic user activity associated with the first user, pattern of electronic activity associated with the first user, or a prior electronic communication associated with the first user with another user.

6. The method of claim 1, wherein the attribute to determine the second user comprises relations between the first user and the second user, a project associated with the first user and with the second user, a title of the first user and of the second user, a position of the first user and the second user or past communication between the first user and the second user.

7. The method of claim 1, wherein the determining whether the first user is unavailable is further based on one or more, settings in software applications configured by the first user, a past communication of the first user, or information on the first user stored in a database, or activity in software applications.

8. A system for improving communication in a digital collaboration environment the system comprising:
a memory; and
at least one processor, operatively connected to the memory and configured to:
receive a digital communication from a source device in the digital collaboration environment, wherein the digital communication is directed to a device associated with a first user, wherein the digital collaboration environment includes one or more of a voice communication, video communication, or a text messaging communication;
cause the device associated with the first user to determine geographical locations associated with the first user over a period of time;
receive the geographical locations associated with the first user over the period of time, from the device associated with the first user to form historical geographical locations associated with the first user;
cause the device associated with the first user to determine a current geographical location associated with the first user;
determine that the first user is unavailable in the digital collaboration environment based on a setting in a software application that is different from the digital collaboration environment and further based on delineation of the current geographical location from historical geographical locations;
in response to determining that the first user is unavailable, determine a second user based on an attribute; and
transmit a notification signal to a device associated with the second user about the communication directed to the device associated with the first user.

9. The system of claim 8, wherein the communication directed to the device associated with first user comprises a text message in the digital collaboration environment.

10. The system of claim 8, wherein the communication is directed to the device associated with first user using a mention symbol.

11. The system of claim 8, wherein determining that the first user is unavailable is further based on at least one of: lack of electronic user activity associated with the first user, pattern of electronic activity associated with the first user, or a prior electronic communication associated with the first user with another user.

12. The system of claim 8, wherein the attribute to determine the second user comprises relations between the first user and the second user, a project associated with the first user and with the second user, a title of the first user and of the second user, a position of the first user and the second user or past communication between the first user and the second user.

13. The system of claim 8, wherein determining the second user is additionally based on a content of the communication directed to the device associated with first user.

14. A web-based server for improving communication in a digital collaboration environment the server comprising:
memory; and
at least one processor, operatively connected to the memory and configured to:
receive a digital communication from a source device in the digital collaboration environment, wherein the digital communication is directed to a device associated with a first user, wherein the digital collaboration environment includes one or more of a voice communication, video communication, or a text messaging communication;
cause the device associated with the first user to determine geographical locations associated with the first user over a period of time;
receive the geographical locations associated with the first user over the period of time, from the device associated with the first user to form historical geographical locations associated with the first user;
cause the device associated with the first user to determine a current geographical location associated with the first user;
determine that the first user is unavailable in the digital collaboration environment based on a setting in a software application that is different from the digital collaboration environment and further based on delineation of the current geographical location from historical geographical locations;
in response to determining that the first user is unavailable, determine a second user based on an attribute; and
transmit a notification signal to a device associated with the second user about the communication directed to the device associated with the first user.

15. The server of claim 14, wherein determining the second user is additionally based on a content of the communication directed to the device associated with first user.

16. The server of claim 14, wherein the communication directed to the device associated with first user comprises a text message in the digital collaboration environment.

17. The server of claim 14, wherein the communication is directed to the device associated with first user using a mention symbol.

18. The server of claim 14, wherein the attribute to determine the second user comprises relations between the first user and the second user, a project associated with the first user and with the second user, a title of the first user and of the second user, a position of the first user and the second user or past communication between the first user and the second user.

19. The server of claim 14, wherein determining that the first user is unavailable is further based on at least one of: lack of electronic user activity associated with the first user, pattern of electronic activity associated with the first user, or a prior electronic communication associated with the first user with another user.

* * * * *